(12) United States Patent
Mitchell et al.

(10) Patent No.: US 8,197,790 B2
(45) Date of Patent: Jun. 12, 2012

(54) METHOD OF MAKING A FILTER MATERIAL INCLUDING ACTIVATED CARBON PARTICLES HAVING CARBON NANOFILAMENTS

(75) Inventors: Michael Donovan Mitchell, Cincinnati, OH (US); Dimitris Ioannis Collias, Mason, OH (US)

(73) Assignee: PUR Water Purification Products, Inc., Cincinnati, OH (US)

( * ) Notice: Subject to any disclaimer, the term of this patent is extended or adjusted under 35 U.S.C. 154(b) by 0 days.

(21) Appl. No.: 12/422,539

(22) Filed: Apr. 13, 2009

(65) Prior Publication Data

US 2009/0194423 A1 Aug. 6, 2009

Related U.S. Application Data

(62) Division of application No. 11/246,372, filed on Oct. 7, 2005, now Pat. No. 7,537,695.

(51) Int. Cl.
*C01B 31/10* (2006.01)
*C01B 31/12* (2006.01)

(52) U.S. Cl. ............... 423/447.3; 423/447.5; 423/460; 502/420; 502/423; 502/426; 502/432; 502/436

(58) Field of Classification Search ........... 502/418, 502/420, 423, 430, 431, 432, 436, 426; 423/460, 423/447.3, 447.5; 427/249.1, 249.4; 977/734, 977/742, 750, 752, 891
See application file for complete search history.

(56) References Cited

U.S. PATENT DOCUMENTS

| 4,969,996 | A |   | 11/1990 | Hankammer |
|---|---|---|---|---|
| 5,431,813 | A |   | 7/1995 | Daniels |
| 5,527,451 | A |   | 6/1996 | Hembree et al. |
| 5,536,394 | A |   | 7/1996 | Lund et al. |
| 5,618,875 | A | * | 4/1997 | Baker et al. ............... 524/495 |
| 5,709,794 | A |   | 1/1998 | Emmons et al. |
| 5,800,706 | A | * | 9/1998 | Fischer ............... 210/198.2 |
| 5,882,507 | A |   | 3/1999 | Tanner et al. |
| 5,957,034 | A |   | 9/1999 | Sham et al. |
| 6,103,114 | A |   | 8/2000 | Tanner et al. |
| 6,120,685 | A |   | 9/2000 | Carlson et al. |
| 6,145,670 | A |   | 11/2000 | Risser |

(Continued)

FOREIGN PATENT DOCUMENTS

JP 2001000860 A 1/2001

(Continued)

OTHER PUBLICATIONS

Venegoni et al., Parametric Study for the growth of carbon nanotubes by catalytic chemical vapor deposition in a fluidized bed reactor, 2002 Pergamon, Carbon 40 (2002), 1799-1807.*

(Continued)

*Primary Examiner* — Matthew Savage
(74) *Attorney, Agent, or Firm* — Amanda T. Barry; Cynthia L. Clay

(57) ABSTRACT

A method of making a filter material for producing potable water comprises providing activated carbon particles, depositing one or more nanofilament precursors at least partially onto the surface of the activated carbon particles, agitating the activated carbon particles and deposited nanofilament precursors in the presence of carbonaceous vapor, and heating the activated carbon particles and the deposited nanofilament precursors in the presence of carbonaceous vapor at a temperature and time sufficient to produce the filter material comprising activated carbon particles having carbon nanofilaments on the surface of the particles.

20 Claims, 3 Drawing Sheets

U.S. PATENT DOCUMENTS

| | | | |
|---|---|---|---|
| 6,214,224 B1 | 4/2001 | Farley | |
| 6,241,899 B1 | 6/2001 | Ramos | |
| 7,214,430 B2* | 5/2007 | Handa et al. | 428/408 |
| 7,217,354 B2 | 5/2007 | Mahurin et al. | |
| 2002/0014453 A1 | 2/2002 | Lilly, Jr. et al. | |
| 2002/0179514 A1 | 12/2002 | Anderson et al. | |
| 2002/0179545 A1 | 12/2002 | Rosenberger et al. | |
| 2003/0029814 A1 | 2/2003 | Begell et al. | |
| 2003/0038084 A1* | 2/2003 | Mitchell et al. | 210/663 |
| 2003/0101700 A1 | 6/2003 | Burdine et al. | |
| 2003/0136728 A1* | 7/2003 | Jagtoyen et al. | 210/502.1 |
| 2003/0155302 A1 | 8/2003 | Meng et al. | |
| 2003/0168401 A1 | 9/2003 | Koslow | |
| 2003/0196963 A1 | 10/2003 | Koslow | |
| 2003/0196964 A1 | 10/2003 | Koslow | |
| 2003/0201231 A1 | 10/2003 | Koslow | |
| 2003/0205529 A1 | 11/2003 | Koslow | |
| 2003/0205530 A1 | 11/2003 | Koslow | |
| 2003/0205531 A1 | 11/2003 | Koslow | |
| 2003/0213750 A1 | 11/2003 | Koslow | |
| 2003/0217963 A1 | 11/2003 | Mitchell et al. | |
| 2003/0217967 A1 | 11/2003 | Mitchell et al. | |
| 2004/0050795 A1 | 3/2004 | Park et al. | |
| 2004/0069720 A1 | 4/2004 | Clausen et al. | |
| 2004/0110633 A1 | 6/2004 | Deevi et al. | |
| 2004/0159596 A1 | 8/2004 | Mitchell et al. | |
| 2004/0164018 A1 | 8/2004 | Mitchell et al. | |
| 2004/0168989 A1 | 9/2004 | Tempest, Jr. | |
| 2005/0011827 A1 | 1/2005 | Koslow | |
| 2005/0035057 A1 | 2/2005 | Zikeli et al. | |
| 2005/0051487 A1 | 3/2005 | Koslow | |
| 2005/0065023 A1 | 3/2005 | Deevi et al. | |
| 2005/0079379 A1 | 4/2005 | Wadsworth et al. | |
| 2005/0092687 A1 | 5/2005 | Scheckel et al. | |
| 2005/0098497 A1 | 5/2005 | Khudenko | |
| 2005/0121545 A1* | 6/2005 | Harutyunyan et al. | 239/654 |
| 2005/0131083 A1 | 6/2005 | Dancuart Kohler et al. | |
| 2005/0131084 A1 | 6/2005 | Kohler et al. | |
| 2005/0131086 A1 | 6/2005 | Dancuart Kohler et al. | |
| 2005/0133427 A1 | 6/2005 | Rinker et al. | |
| 2009/0220767 A1* | 9/2009 | Schlogl et al. | 428/323 |

FOREIGN PATENT DOCUMENTS

| | | |
|---|---|---|
| JP | 2003310180 A | 11/2003 |
| JP | 2004265698 A | 9/2004 |
| JP | 2005008446 A | 1/2005 |
| JP | 2005043291 A | 2/2005 |
| KR | 2003-0095694 | 12/2003 |
| WO | WO 02/100775 A2 | 12/2002 |
| WO | WO 2004/080217 A1 | 9/2004 |
| WO | WO 2004/080578 A1 | 9/2004 |

OTHER PUBLICATIONS

Lim, S. et al.; Surface Control of Activated Carbon Fiber by Growth of Carbon Nanofiber; Langmuir; 2004; pp. 5559-5563; 20; American Chemical Society.

Park, C. et al.; Catalyst support effects in the growth of structured carbon from the decomposition of ethylene over nickel; Journal of Catalysis; 2003; pp. 386-399; Elsevier Inc.

Srivastava, A. et al.; Carbon Nanotube Filters; Nature Material; Sep. 2004; pp. 610-614; 3(9); Nature Publishing Group.

Nemmara, H.; Synthesis, characterization, and testing of carbon nanofibers for coalescence filtration of oil from compressed air and adsorption of chloroform from air; Dissertation Abstracts International; Jan. 2004; p. 3402-B; vol. 64; No. 7.

Song, L. et al.; Direct Synthesis of a Macroscale Single-Walled Carbon Nanotube Non-Woven Material; Advanced Materials; Sep. 3, 2004; pp. 1529-1534; vol. 16 No. 17; Wiley-VCH Verlag GmbH & Co. KGaA, Weinheim.

Viswanathan, G. et al.; High Efficiency Fine Particulate Filtration Using Carbon Nanotube Coatings; Advanced Materials; Nov. 18, 2004; pp. 2045-2049; vol. 16, No. 22; Wiley-VCH Verlag GmbH & Co. KGaA, Weinheim.

Gibson, P. et al.; Effect of Carbon Particulate Content and Surface Nanofibers Upon Filtration Performance of Nonwoven Media; Advances in Filtration and Separation Technology; 2003; pp. 306-317; vol. 16.

Fiedler, B. et al.; Can Carbon Nanotubes Be Used to Sense Damage in Composites?; Ann. Chim. Sci. Mat.; 2004; pp. 81-94; 29(6); Lavoisier, Paris.

Zhang, L. et al.; Controlled transport of latex beads through vertically aligned carbon nanofiber membranes; Applied Physics Letters; Jul. 1, 2002; pp. 135-137; vol. 81; No. 1; American Institute of Physics.

Novak, J. et al.; Nerve agent detection using networks of single-walled carbon nanotubes; Applied Physics Letters; Nov. 10, 2003; pp. 4026-4028; vol. 83; No. 19; American Institute of Physics.

Reyes-Reyes, M. et al.; Efficient encapsulation of gaseous nitrogen inside carbon nanotubes with bamboo-like structure using aerosol thermolysis; Chemical Physics Letters; 2004; pp. 167-173; 396; Elsevier B.V.

Lecoanet, H. et al.; Laboratory Assessment of the Mobility of Nanomaterials in Porous Media; Environmental Science & Technology; 2004; pp. 5164-5169; vol. 38; No. 19; American Chemical Society.

Wirtz, M. et al.; Transport Properties of Template-Synthesized Gold and Carbon Nanotube Membranes; International Journal of Nanoscience; 2002; pp. 255-268; vol. 1, Nos. 3 & 4; World Scientific Publishing Company.

Liang, Z. et al.; Investigation of Magnetically Aligned Carbon Nanotube Bucky Papers/Epoxy Composites; 48th International SAMPE Symposium; May 11-15, 2003; pp. 1627-1634.

Kim, G. et al.; Fano resonance and orbital filtering in multiply connected carbon nanotubes; Physical Review; 2005; pp. 205415-1-205415-5; vol. 71; The American Physical Society.

Marliere, C. et al.; Effect of Gas Adsorption on the Electrical Properties of Single Walled Carbon Nanotubes Mats; Material Research Society Symposium Proceedings; 2000; pp. 173-177; vol. 593.

Gogotsi, Y. et al.; Nanoporous carbide-derived carbon with tunable pore size; Nature Materials; Sep. 2003; pp. 591-594; vol. 2; Nature Publishing Group.

Chen, Z. et al.; Removal of the Total Particulate Matter from Cigarette Smoke through Carbon Nanotubes; Chinese Journal of Applied Chemistry; Apr. 2004; pp. 365-368; vol. 21, No. 4.

Li, Y-H et al.; Adsorption of fluoride from water by aligned carbon nanotubes; Materials Research Bulletin; Feb. 20, 2003; pp. 469-476; vol. 38; Issue 3; Elsevier Science Ltd.

Tanioka, Akihiko; Nanofiber Technology and its Application; Clean Technology; 2003; pp. 62-65.

* cited by examiner

METHOD OF MAKING A FILTER MATERIAL INCLUDING ACTIVATED CARBON PARTICLES HAVING CARBON NANOFILAMENTS

CROSS REFERENCE TO RELATED APPLICATIONS

This application is a divisional of U.S. application Ser. No. 11/246,372 filed Oct. 7, 2005 now U.S. Pat. No. 7,537,695 and is herein incorporated by reference.

FIELD OF THE INVENTION

The present invention relates to water filters, and specifically relates to water filters employing filter material comprising activated carbon particles and carbon nanofilaments on the particle surface, and methods of making and using the same. More specifically, the water filters are directed to removing contaminants from a water stream to provide potable water.

BACKGROUND OF THE INVENTION

Water may contain many different kinds of contaminants including, for example, particulates, harmful chemicals, and microbiological organisms, such as bacteria, parasites, protozoa and viruses. In a variety of circumstances, these contaminants must be removed before the water can be used. For example, in many medical applications and in the manufacture of certain electronic components, extremely pure water is required. As a more common example, any harmful contaminants must be removed from the water before it is potable, i.e., fit to consume. Despite modern water purification means, the general population is at risk, and in particular infants and persons with compromised immune systems are at considerable risk.

In the U.S. and other developed countries, municipally treated water typically includes one or more of the following impurities to various levels: suspended solids, chemical contaminants, such as organic matter, and heavy metals, and microbiological contaminants, such as bacteria, parasites, and viruses. Breakdown and other problems with water treatment systems sometimes lead to incomplete removal of these contaminants. In other countries, there are deadly consequences associated with exposure to contaminated water, as some of them have increasing population densities, increasingly scarce water resources, and no water treatment utilities. It is common for sources of drinking water to be in close proximity to human and animal waste, such that microbiological contamination is a major health concern. As a result of waterborne microbiological contamination, an estimated six million people die each year, half of which are children under 5 years of age.

The reduction of the general contaminant concentration in the potable water takes place at the municipal treatment facilities and in homes with point-of-entry (POE) and/or point-of-use (POU) water filters. This reduction in concentration in the home water filters is achieved by mechanical filtration, (i.e., size exclusion for some particulates, parasites, and bacteria), and adsorption (i.e., chemicals, some particulates, parasites, bacteria, and viruses). For home water filters, the concentration reduction levels depend on the flowrate, filter volume and shape, influent concentration levels, and capture kinetics and capacity of the filtration medium. For the purposes of this invention, the capture kinetics and capacity of the medium is encompassed in the term "capture efficiency." Furthermore, if the concentration reduction levels achieved by home water filters reach the levels mandated by various domestic or international organizations (e.g., U.S. Environmental Protection Agency—EPA, National Sanitation Foundation—NSF, and World Health Organization—WHO) in pertinent testing standards and protocols, then the water filters can be registered by these organizations and carry the applicable registration numbers. Similar tests and standards apply to air filters.

For example, the EPA introduced the "*Guide Standard and Protocol for Testing Microbiological Water Purifiers*" in 1987. This protocol establishes minimum requirements regarding the performance of drinking water treatment systems that are designed to reduce specific health related contaminants in public or private water supplies. The requirements are that the effluent from a water supply source exhibits 99.99% (or equivalently, 4 log) removal of viruses and 99.9999% (or equivalently, 6 log) removal of bacteria against a challenge. Under the EPA protocol, in the case of viruses, the influent concentration should be $1\times10^7$ viruses per liter, and in the case of bacteria, the influent concentration should be $1\times10^8$ bacteria per liter. Because of the prevalence of *Escherichia coli* (*E. coli*, bacterium) in water supplies, and the risks associated with its consumption, this microorganism is used as the bacterium in the majority of studies. Similarly, the MS-2 bacteriophage (or simply, MS-2 phage) is typically used as the representative microorganism for virus removal because its size and shape (i.e., about 26 nm and icosahedral) are similar to many viruses. Thus, a filter's ability to remove MS-2 bacteriophage demonstrates its ability to remove other viruses.

Similar protocols and/or standards exist for chemical and particulate concentration reductions established by NSF. For example, NSF/ANSI Standard 42 covers the aesthetic effects of POU and POE systems designed to reduce specific aesthetic or non-health-related contaminants, such as chlorine, taste and odor, and particulates. Similarly, NSF/ANSI Standard 53 covers the health effects of POU and POE systems designed to reduce specific health-related contaminants, such as *Cryptosporidium, Giardia*, lead, volatile organic chemicals (VOCs), and methyl tertiary-butyl ether (MTBE).

Due to these requirements and a general interest in improving the quality of potable water, there is a continuing desire to provide improved filters and filter materials capable of removing contaminants from a water stream, as well as a desire to provide improved methods of making and using the filter materials, and filters incorporating the filter materials.

SUMMARY OF THE INVENTION

According to a first embodiment, a method of making a filter material for producing potable water is provided. The method comprises providing activated carbon particles, depositing one or more nanofilament precursors at least partially onto the surface of the activated carbon particles, agitating the activated carbon particles and the deposited nanofilament precursors in the presence of carbonaceous vapor, and heating the activated carbon particles and the deposited nanofilament precursors in the presence of carbonaceous vapor at a temperature and time sufficient to produce the filter material comprising activated carbon particles having carbon nanofilaments on the surface of the particles.

According to a second embodiment, a method of making a filter material for producing potable water is provided. The method comprises providing carbonized carbon particles, depositing one or more nanofilament precursors at least partially onto the surface of the carbonized carbon particles, agitating the carbonized carbon particles and the deposited nanofilament precursors in the presence of carbonaceous vapor, heating the carbonized carbon particles and the deposited nanofilament precursors in the presence of carbonaceous vapor at a temperature and time sufficient to produce carbon nanofilaments on the surface of the carbonized carbon particles, and activating the carbonized carbon particles by heating or chemically treating the carbonized particles and carbon nanofilaments to produce the filter material comprising activated carbon particles having carbon nanofilaments on the surface of the particles.

Filters for producing potable water, and the methods of making and using the filter material incorporated in the filter according to the invention are advantageous in the removal of contaminants from a water stream. Additional features and advantages provided by the filters, filter materials, and methods of the present invention will be more fully understood in view of the following detailed description.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

I. Definitions

Figure 1:
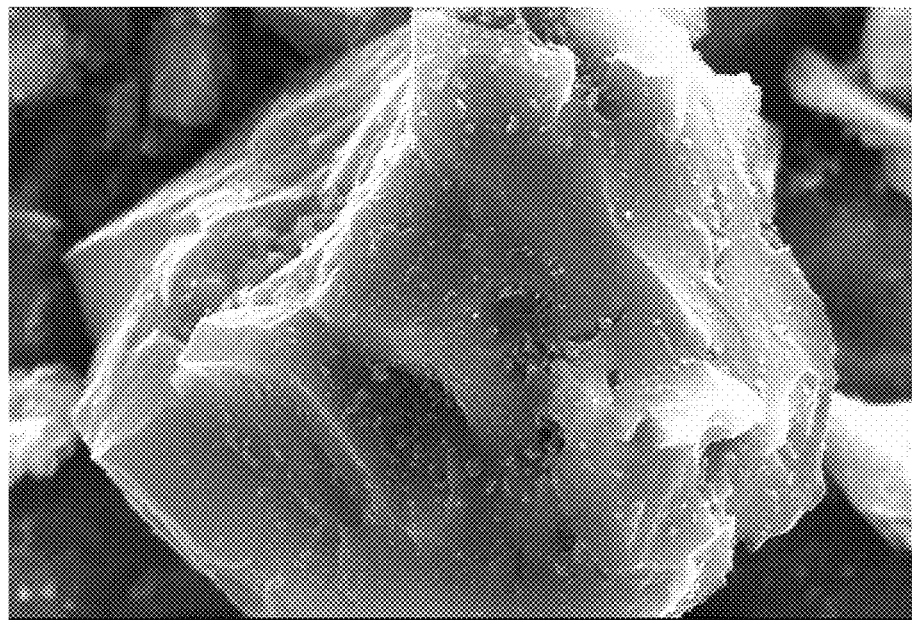
FIG. 1 is a Scanning Electron Microscope (SEM) image of a prior art activated carbon particle.

As used herein, the terms "filters" and "filtration" refer to structures and mechanisms, respectively, associated with reduction of concentration of contaminants, i.e., particulates, chemical and microbiological contaminants, via either adsorption and/or size exclusion.

As used herein, the phrase "filter material" is intended to refer to an aggregate or collection of filter particles. The aggregate or collection of the filter particles forming a filter material can be either homogeneous or heterogeneous, and can take any shape or form. The filter particles can be uniformly or non-uniformly distributed (e.g., layers of different filter particles) within the filter material. The filter particles forming a filter material also need not be identical in shape or size and may be provided in either a loose or interconnected form. For example, a filter material might comprise activated carbon particles with surface-grown nanofilaments in combination with activated carbon fibers or mesoporous and basic activated carbon particles, and these filter particles may be either provided in loose association or partially or wholly bonded by a polymeric binder or other means to form an integral structure.

As used herein, the phrase "filter particle" is intended to refer to an individual member or piece, which is used to form at least part of a filter material. For example, a fiber, a granule, a bead, etc. are each considered filter particles herein. Further, the filter particles can vary in size, from impalpable filter particles (e.g., a very fine powder) to palpable filter particles.

As used herein, the term "nanofilament" and its derivatives refer to carbon hollow or solid structures with lateral dimension (e.g., diameter, width, or thickness) on the order of nanometers (nm) and longitudinal dimension (e.g., length) from a few nanometers to hundreds of microns (μm), which emanate and protrude from the surfaces of the activated carbon particles. A non-limiting list of examples of nanofilaments of the present invention includes single-wall nanotubes (SWNTs), double-wall nanotubes (DWNTs), multi-wall nanotubes (MWNTs), nanofibers, nanoribbons, nanohorns, or mixtures thereof.

As used herein, the term "contaminant" and its derivatives may refer to any of the following 3 categories: particulates (e.g., turbidity, and insoluble inorganic particles such as calcium carbonate), chemicals (e.g., chlorine, taste, odor, VOCs, asbestos, atrazine, MTBE, arsenic and lead), microbiological organisms (e.g., bacteria, viruses, algae, and parasites), or combinations thereof. Further contaminants are also contemplated herein.

As used herein, the term "carbonization" and its derivatives are intended to refer to a process in which the non-carbon species in a carbonaceous substance are reduced.

As used herein, the term "activation" and its derivatives are intended to refer to a process in which a carbonized substance is rendered more porous.

As used herein, the term "activated particles" and its derivatives are intended to refer particles that have been subjected to an activation process.

As used herein, the term "deposition" and its derivatives refer to processes that deliver particles or generally substances onto or into a substrate. Non-limiting examples of deposition processes are adsorption and mixing. Additional deposition examples included electrochemical deposition, electron-beam evaporation, thermal vapor deposition, and/or radio frequency magnetron sputtering.

II. Embodiments

Figure 3:
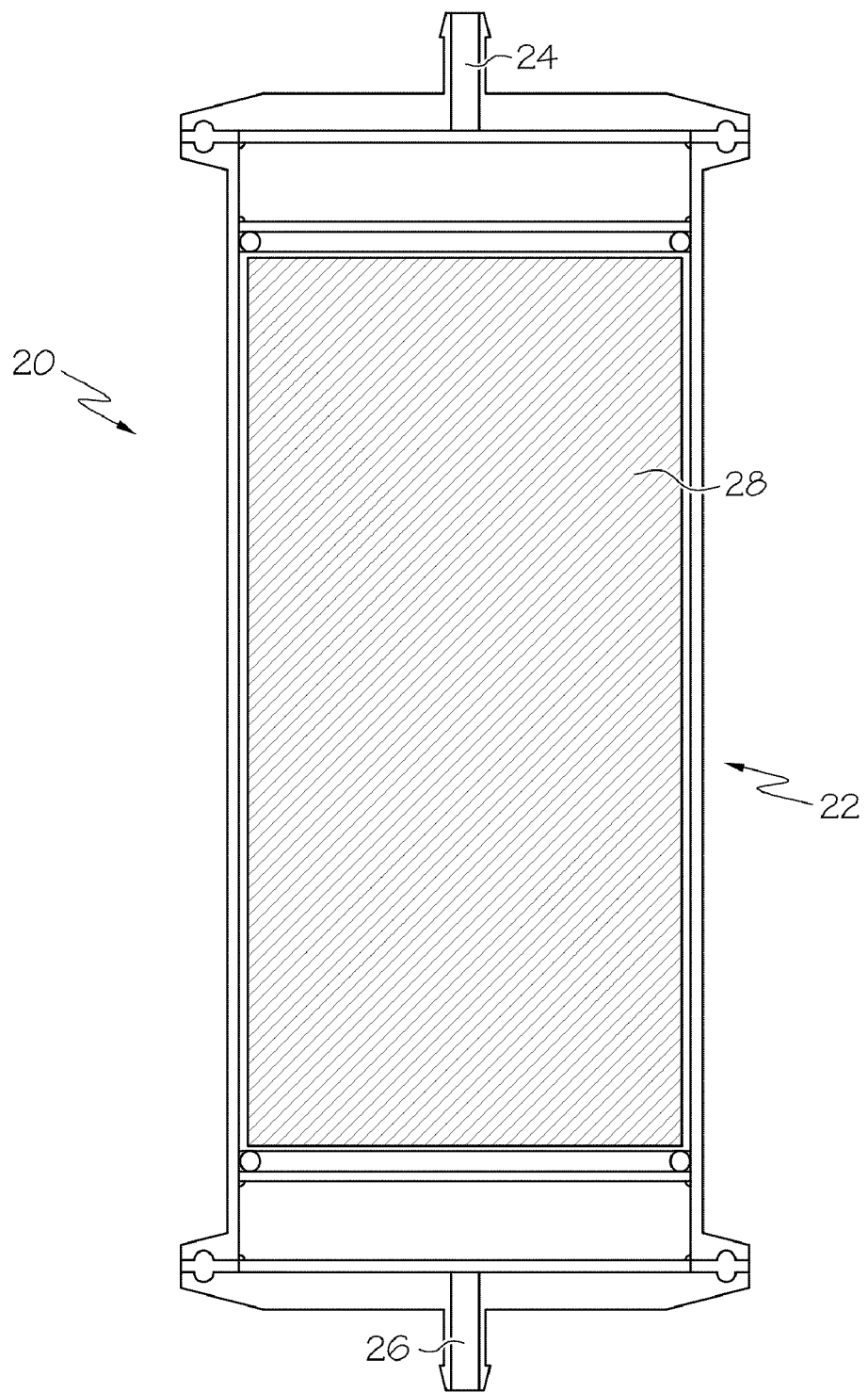
FIG. 3 is a cross sectional side view of a filter according to one or more embodiments of the present invention.

In accordance with one embodiment as shown in FIG. 3, a filter 20 for producing potable water is provided. The filter 20 comprises a housing 22 including a water inlet 24 and a water outlet 26. The FIG. 3 embodiment illustrates a cylindrical shaped embodiment; however, the housing 22 can be provided in a variety of forms, shapes, sizes, and arrangements depending upon the intended use of the filter, as known in the art. For example, the filter can be an axial flow filter, wherein the inlet and outlet are disposed so that the liquid flows along the axis of the housing. Alternatively, the filter can be a radial flow filter wherein the inlet and outlet are arranged so that the fluid flows along a radial of the housing. Still further, the filter can include both axial and radial flows. The housing may also be formed as part of another structure without departing from the scope of the present invention.

The size, shape, spacing, alignment, and positioning of the inlet 24 and outlet 26 can be selected, as known in the art, to accommodate the flow rate and intended use of the filter 20. In one exemplary embodiment, the filter 20 is configured for use in residential or commercial potable water applications. Examples of filter configurations, potable water devices, consumer appliances, and other water filtration devices suitable for use with the present invention are disclosed in U.S. Pat. Nos. 5,527,451; 5,536,394; 5,709,794; 5,882,507; 6,103,114; 4,969,996; 5,431,813; 6,214,224; 5,957,034; 6,145,670; 6,120,685; and 6,241,899, the substances of which are incorporated herein by reference. According to multiple potable water embodiments, the filter 20 may be configured to accommodate a flow rate of less than about 8 L/min of water, or less than about 6 L/min, or from about 2 L/min to about 4 L/min Referring to FIG. 3, the filter 20 comprises filter material 28 arranged in the housing 22. The housing 22 may contain as much filter material 28 as desired by the filtering application. The housing may contain less than about 2 kg of filter material, or less than 1 kg of filter material, or less than 0.5 kg of filter material. The filter particles present in the filter material 28 are activated carbon particles having a plurality of carbon nanofilaments disposed on the surface of the activated carbon particles. The filter particles may comprise a variety of shapes and sizes. For example, the filter particles can be provided in simple forms such as granules, fibers, and beads. The filter particles can be provided in the shape of a sphere, polyhedron, cylinder, as well as other symmetrical, asymmetrical, and irregular shapes. Further, the filter particles can also be formed into complex forms such as webs, screens, meshes, non-wovens, wovens, and bonded blocks, which may or may not be formed from the simple forms described above.

Like shape, the size of the filter particles can also vary, and the size need not be uniform among filter particles used in any single filter. In fact, it can be desirable to provide filter particles having different sizes in a single filter. The filter particles may have a size of about 0.1 µm to about 10 mm. In exemplary embodiments, the filter particles may have a size of about 0.2 µm to about 5 mm, from about 0.4 µm to about 1 mm, or from about 1 µm to about 500 µm. For spherical and cylindrical particles (e.g., fibers, beads, etc.), the above-described dimensions refer to the diameter of the filter particles. For filter particles having substantially different shapes, the above-described dimensions refer to the largest dimension (e.g., length, width, or height).

The filter particles may comprise any suitable activated carbon particles, or in some embodiments, pre-activated carbonized carbon particles. For example and not by way of limitation, the activated carbon particles can be microporous, mesoporous, or combinations thereof. Furthermore, the activated carbon particles may comprise wood-based activated carbon particles, coal-based activated carbon particles, peat-based activated carbon particles, pitch-based activated carbon particles, tar-based activated carbon particles, or combinations thereof. The filter material 28 may be provided in either a loose or interconnected form (e.g., partially or wholly bonded by a polymeric binder or other means to form an integral structure).

Figure 2A:
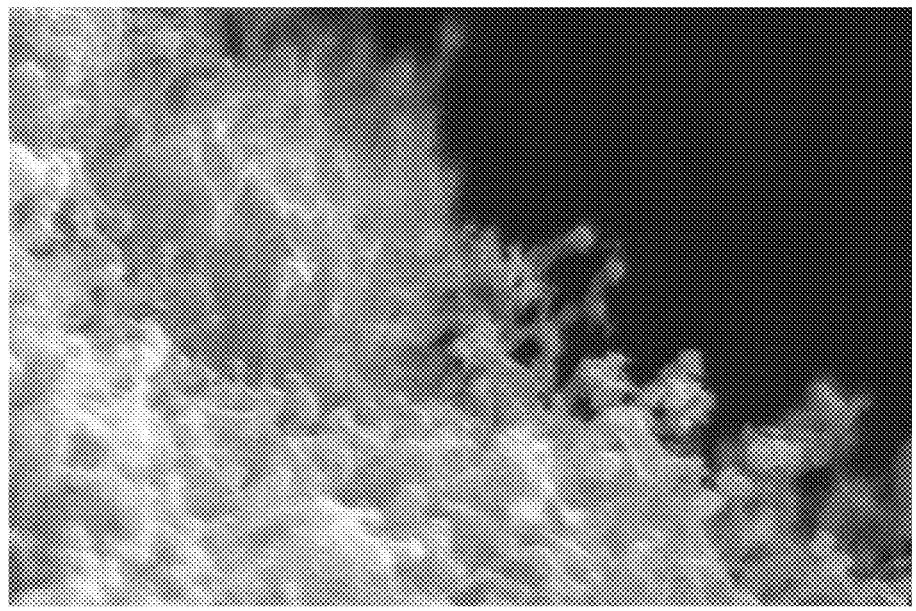
FIG. 2a is an SEM image of an activated carbon particle according to one or more embodiments of the present invention.
Figure 2B:
FIG. 2b is another SEM image of an activated carbon particle according to one or more embodiments of the present invention.
Figure 2C:
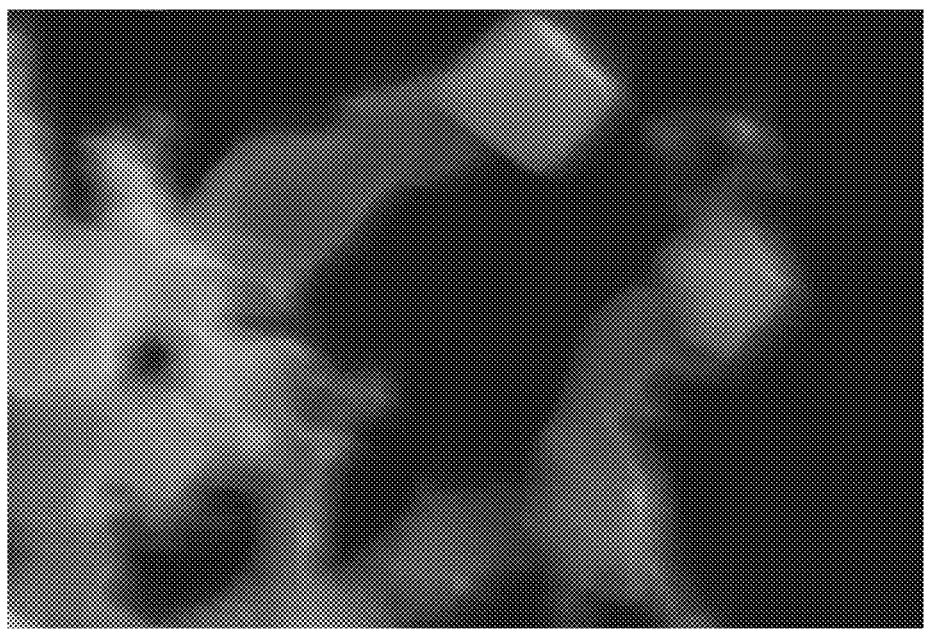
FIG. 2c is a higher magnification SEM image of an activated carbon particle according to one or more embodiments of the present invention.

Activated carbon particles with surface-grown nanofilaments have capture efficiencies for contaminants higher than activated carbon particles without nanofilaments. A scanning electron micrograph (SEM) of an activated carbon particle without nanofilaments is shown in FIG. 1, and SEM's of activated carbon particles with surface-grown nanofilaments are shown in FIGS. 2a and 2b. In one of many contemplated filtering embodiments, a large number of surface-grown nanofilaments may yield more adsorption sites and a large number of size exclusion sites for the various contaminants. During operation of the filter 20, a water stream passes from the water inlet 24 to the water outlet 26 of the filter 20. As the water stream passes though the filter material 28, contaminants are removed in order to deliver potable water through the water outlet 26 of the filter 20. In one embodiment, this contaminant removal may result from contaminant adsorption to the adsorption sites of the filter particles.

In accordance with another embodiment, a method of making filter material 28 for producing potable water is provided. The method comprises providing activated carbon particles, and depositing one or more nanofilament precursors at least partially onto the surface of the activated carbon particles. The nanofilaments may be deposited via any suitable conventional technique known to one skilled in the art. Examples of deposition techniques are provided in the definition section above. In one embodiment, these nanofilament precursors comprise catalysts and may be present in a solid, liquid or gas phase. In a specific embodiment, the nanofilament precursors comprise catalysts, which comprise salts of transition metals. These salts of transition metals may include Fe, Co, Mo, and Ni, or mixtures thereof. Examples of the nanofilament precursors, include, but are not limited to, ferric sulfate (($Fe_2(SO_4)_3$), ferric chloride ($FeCl_3$), ferrocene ($Fe(C_5H_5)_2$), cobaltocene ($Co(C_5H_5)_2$), nickelocene ($Ni(C_5H_5)_2$), ferric oxide ($Fe_2O_3$), iron pentacarbonyl ($Fe(CO)_5$), and nickel phthalocyanine ($C_{32}H_{16}N_8Ni$).

The method further comprises agitating the activated carbon particles and deposited nanofilament precursors in the presence of carbonaceous vapor, and heating the activated carbon particles and the deposited nanofilament precursors in the presence of carbonaceous vapor at a temperature and time sufficient to produce the filter material comprising activated carbon particles having carbon nanofilaments on the surface of the particles. In accordance with the method, the carbonaceous vapor contacts and reacts with the activated carbon particles and deposited nanofilament precursors in a heated environment, for example, a furnace or reactor. If the activated carbon particles and deposited nanofilaments are arranged in a stationary configuration e.g. inside a fixed-bed flow reactor, the carbonaceous vapor will likely contact only the top layer of the particles or the top surface of the particles which are exposed to the vapor. This could limit the amount of carbon nanofilaments produced on the activated carbon particle surface, because not all surfaces of the stationary activated carbon particles and deposited precursors may be exposed to the carbonaceous vapor. In contrast to the stationary configuration, agitating or fluidizing the activated carbon particles and deposited nanofilament precursors will ensure the carbonaceous vapor contacts more surface area of the activated carbon particles and deposited precursors, thus yielding more carbon nanofilaments produced on the activated carbon particles surfaces. Reactors suitable to agitate the activated carbon particles may include, but are not limited to, fluidized bed reactors, rotating bed reactors, conventional fixed bed reactors comprising agitating or mixing components, etc.

The carbonaceous vapor may comprise any carbonaceous vapor, which is effective in providing the desired reaction product. In one embodiment, the carbonaceous vapor may comprise acetylene, benzene, xylene, ethylene, methane, ethanol, carbon monoxide, camphor, naphthalene, or mixtures thereof. The reaction conditions of temperature, time, and atmosphere may vary, and various combinations are suitable to promote the desired reaction. In one embodiment, the temperature may vary from about 400° C. to about 1500° C. In exemplary embodiments, the temperature range may comprise upper limits of less than about 1200° C., less than about 1000° C., or less than about 800° C., and lower limits of more than about 400° C., more than about 500° C., more than about 600° C., or more than about 700° C. In another embodiment, the reaction time is about 2 minutes to about 10 hours. In exemplary embodiments, the reaction time is from about 5 minutes to about 8 hours, from about 10 minutes to about 7 hours, or from about 20 minutes to about 6 hours.

In one embodiment, the nanofilament precursors may generate nanoparticles on the surface of the activated carbon particles during the initial stages of the method. For example, ferric sulfate will decompose and generate Fe nanoparticles on the surface of the activated carbon particles. These nanoparticles will then catalyze the formation of carbon nanofilaments as the carbonaceous vapors are carried over the catalyst particles to build the carbon nanofilaments.

Moreover, the method may further comprise a carrier gas to deliver the carbonaceous vapor to the surface of the carbon particles. The reaction atmosphere may comprise the carbonaceous vapor and the carrier gas that brings them in contact with the activated carbon particles and nanofilament precursors during the reaction. The carrier gas can be inert or reducing, and, in one embodiment, it can contain small amounts of steam. A typical and non-limiting example of such a carrier gas is nitrogen. Argon and helium are two other examples of carrier gases; however, numerous other suitable carrier gases are contemplated herein. The face velocity of the carrier gas in the furnace is from about 1 cm/h.g (i.e., centimeters per hour and gram of activated carbon particles) to about 350 cm/h.g, and in exemplary embodiments, from about 2 cm/h.g to about 180 cm/h.g, from about 4 cm/h.g to about 90 cm/h.g, or from about 20 cm/h.g to about 40 cm/h.g.

In accordance with another embodiment of the present invention, an alternative method of making filter material 28 for producing potable water is described herein. The method comprises providing carbonized carbon particles. As stated above, carbonized particles are filter particles, which have not yet undergone an activation step. Similar to the other method described above, the method further comprises depositing at least partially one or more nanofilament precursors onto the surface of the carbonized carbon particles, and agitating the carbonized carbon particles and deposited nanofilament precursors in the presence of carbonaceous vapor. The carbonized carbon particles and the deposited nanofilament precursors are then heated in the presence of carbonaceous vapor at a temperature and time sufficient to produce carbon nanofilaments on the surface of the carbonized carbon particles. The method then includes activating the carbonized carbon particles. During activation, the carbonized particles and carbon nanofilaments are heated or chemically treated to produce the filter material, which comprises activated carbon particles having carbon nanofilaments on the surface of the particles.

The carbonized carbons may be heat activated under various processing conditions well known to one skilled in the art. For example, the heat activation may occur in an atmosphere comprising steam, $CO_2$, or mixtures thereof. Moreover, the activation temperatures and duration may vary depending on the filter particles used. Carbonized carbons may also be chemically activated with any suitable chemical reagent known to one skilled in the art. For example, the carbonized carbons may be treated with KOH, or $H_3PO_4$. The activation step may be incorporated at any stage of the above-described methods. Activation may occur in one or multiple steps, and activated carbon particles may undergo further activation.

In a further embodiment, the above-described methods may further comprise a cleaning step directed to cleaning the carbon nanofilaments and substantially removing any remaining nanofilament precursors after the heating step. Like activation, the cleaning step may incorporate heat treatment or chemical treatment in order to clean the nanofilaments and remove nanofilament precursors. Any cleaning procedure may be employed. In one embodiment of chemical cleaning, an acid solution may be used. In an exemplary embodiment, a strong acid solution, for example, a nitric or sulfuric acid solution may be used in the cleaning step. It is contemplated that an activation step utilized after the formation of the carbon nanofilaments, as described above, may act as a cleaning step or a partial cleaning step.

In a further embodiment, the above-described methods may comprise treating the carbonized or activated carbon particles and deposited nanofilament precursors with a reducing agent prior to the heating step. During this reduction step, the particles and deposited nanofilament precursors are treated in the presence of reducing agents to functionalize the particle surface. By functionalizing the surface, the filter particles may improve its adsorption to targeted contaminants in a water stream. Non-limiting examples of reducing agents include hydrogen, ammonia, or mixtures thereof. For example, a reducing agent comprising ammonia may react with the particle surface to produce nitrogen on the surface of the particle, wherein the nitrogen may bind or adsorb to a contaminant to be filtered.

III. Experimental Examples

The following non-limiting examples describe filter materials, and methods of making filter materials in accordance with one or more embodiments of the present invention.

Example 1

Formation of Activated Carbon Particles with Surface-Grown Nanofilaments Using Ferrocene 100 g of the NUCHAR™ RGC 80×325 wood-based activated carbon particles from MeadWestvaco Corp., of Covington, Va., are mixed with 500 mL solution of 10% ferrocene ($Fe(C_5H_5)_2$) in xylene. The resulting activated carbon with adsorbed ferrocene is dried overnight at room temperature. The activated carbon is then loaded into the tray of the horizontal tube furnace Lindberg/Blue M (Model # HTF55667C; SPX Corp.; Muskegon, Mich.). The diameter of the tube furnace is 15.25 cm (6 in.). The furnace is heated to 800° C. in 15 ft$^3$/h nitrogen flow. Once the desired furnace temperature is reached, a 10 mL/min solution of 10% ferrocene in xylene is carried into the tube furnace by a nitrogen stream of 15 ft$^3$/h (i.e., face velocity of about 23 cm/h.g) for 1 h. At the end of that period, the material is allowed to cool to room temperature in a nitrogen atmosphere. The resulting activated carbon particles contain surface-grown nanofilaments.

Example 2

Formation of Activated Carbon Particles with Surface-Grown Nanofilaments Using Ferric Sulfate and Ferrocene 100 g of microporous coconut activated carbon particles 80×325 from Calgon Carbon Corp., of Pittsburgh, Pa., are mixed with 100 mL solution of 20% ferric sulfate ($Fe_2(SO_4)_3$) in deionized water. The resulting activated carbon with adsorbed ferric sulfate is dried overnight in an oven at 130° C. The activated carbon is then loaded into the tray of the horizontal tube furnace Lindberg/Blue M (Model # HTF55667C; SPX Corp.; Muskegon, Mich.). The diameter of the tube furnace is 15.25 cm (6 in.). The furnace is heated to 800° C. in 15 ft$^3$/h nitrogen flow. Once the desired furnace temperature is reached, the activated carbon is held at that temperature for about 45 min. Then, a 4 mL/min solution of 10% ferrocene in xylene is carried into the tube furnace by a nitrogen stream of 5 ft$^3$/h (i.e., face velocity of about 8 cm/h.g) for 1 h. At the end of that period, the material is allowed to cool to room temperature in a nitrogen atmosphere. The resulting activated carbon particles contain surface-grown nanofilaments.

It is noted that terms like "specifically," "preferably," "typically," and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a filter material for producing potable water comprising:
   providing a plurality of loose activated carbon particles comprising a largest dimension of from about 1 to about 500 μm;
   depositing one or more nanofilament precursors at least partially onto the surface of the loose activated carbon particles;
   agitating the activated carbon particles and deposited nanofilament precursors in the presence of carbonaceous vapor; and
   heating the activated carbon particles and the deposited nanofilament precursors in the presence of carbonaceous vapor at a temperature and time sufficient to produce the filter material comprising activated carbon particles having carbon nanofilaments on the surface of the particles.

2. A method according to claim 1 further comprising cleaning the carbon nanofilaments and substantially removing any remaining nanofilament precursors after the heating step.

3. A method according to claim 2 wherein the cleaning utilizes heat treatment, or chemical treatment.

4. A method according to claim 3 wherein the chemical treatment comprises cleaning with an acid solution.

5. A method according to claim 1 further comprising treating the carbon particles and deposited nanofilament precursors with a reducing agent prior to the heating step.

6. A method according to claim 5 wherein the reducing agent comprises hydrogen, ammonia, or mixtures thereof.

7. A method according to claim 1 further wherein the nanofilament precursors are deposited onto the activated carbon particles by electrochemical deposition, electron-beam evaporation, thermal vapor deposition, and/or radio frequency magnetron sputtering.

8. A method according to claim 1 wherein the nanofilament precursors comprise catalysts.

9. A method according to claim 8 wherein the catalysts comprise salts of transition metals.

10. A method according to claim 1 wherein the reaction temperature is from about 400° C. to about 1500° C.

11. A method according to claim 1 wherein the reaction time is from about 2 minutes to about 10 hours.

12. A method according to claim 1 further comprising providing a carrier gas to deliver the carbonaceous vapor to the surface of the carbon particles, wherein the carbonaceous vapor comprise acetylene, benzene, xylene, ethylene, methane, ethanol, carbon monoxide, camphor, naphthalene, or mixtures thereof.

13. A method of making a filter material for producing potable water comprising:
   providing a plurality of loose carbonized carbon particles comprising a largest dimension of from about 1 to about 500 μm;
   depositing one or more nanofilament precursors at least partially onto the surface of the loose carbonized carbon particles;
   agitating the carbonized carbon particles and deposited nanofilament precursors in the presence of carbonaceous vapor;
   heating the carbonized carbon particles and the deposited nanofilament precursors in the presence of carbonaceous vapor at a temperature and time sufficient to produce carbon nanofilaments on the surface of the carbonized carbon particles; and
   activating the carbonized carbon particles by heating or chemically treating the carbonized particles and carbon nanofilaments to produce the filter material comprising activated carbon particles having carbon nanofilaments on the surface of the particles.

14. A method according to claim 13 further comprising cleaning the carbon nanofilaments and substantially removing any remaining nanofilament precursors after the heating step.

15. A method according to claim 14 wherein the cleaning utilizes heat treatment, or chemical treatment.

16. A method according to claim 13 further comprising treating the carbonized carbon particles and deposited nanofilament precursors with a reducing agent prior to the heating step.

17. A method according to claim 13 further wherein the nanofilament precursors are deposited onto the activated carbon particles by electrochemical deposition, electron-beam evaporation, thermal vapor deposition, and/or radio frequency magnetron sputtering.

18. A method according to claim 13 wherein the nanofilament precursors comprise catalysts, the catalysts being comprised of transition metals.

19. A method according to claim 13 wherein the reaction temperature is from about 400° C. to about 1500° C., and the reaction time is from about 2 minutes to about 10 hours.

20. A method according to claim 13 wherein the carbonaceous vapor comprises acetylene, benzene, xylene, ethylene, methane, ethanol, carbon monoxide, camphor, naphthalene, or mixtures thereof.

* * * * *